(12) United States Patent
Twigg

(10) Patent No.: US 6,978,601 B1
(45) Date of Patent: Dec. 27, 2005

(54) REGENERATING SULPHUR POISONED DIESEL CATALYSTS

(75) Inventor: Martyn Vincent Twigg, Cambridge (GB)

(73) Assignee: Johnson Matthey Public Limited Company, London (GB)

(*) Notice: Subject to any disclaimer, the term of this patent is extended or adjusted under 35 U.S.C. 154(b) by 0 days.

(21) Appl. No.: 10/070,873

(22) PCT Filed: Sep. 4, 2000

(86) PCT No.: PCT/GB00/03379

§ 371 (c)(1), (2), (4) Date: Aug. 12, 2002

(87) PCT Pub. No.: WO01/19500

PCT Pub. Date: Mar. 22, 2001

(30) Foreign Application Priority Data

Sep. 10, 1999 (GB) .................................. 9921376

(51) Int. Cl.[7] .............................................. F01N 3/00
(52) U.S. Cl. ........................... 60/295; 60/274; 60/285; 60/286; 60/297; 60/311
(58) Field of Search .................... 60/274, 277, 286, 60/285, 295, 297, 311

(56) References Cited

U.S. PATENT DOCUMENTS

| | | | |
|---|---|---|---|
| 5,575,983 A | 11/1996 | Suzuki et al. | |
| 5,724,808 A * | 3/1998 | Ito et al. | 60/276 |
| 5,746,989 A | 5/1998 | Murachi et al. | |
| 5,850,735 A * | 12/1998 | Araki et al. | 60/274 |
| 5,974,788 A * | 11/1999 | Hepburn et al. | 60/274 |
| 6,199,374 B1 * | 3/2001 | Hirota et al. | 60/277 |
| 6,233,925 B1 * | 5/2001 | Hirota et al. | 60/285 |

FOREIGN PATENT DOCUMENTS

| | | |
|---|---|---|
| EP | 0 341 832 | 11/1989 |
| EP | 0 580 389 | 1/1994 |
| EP | 0 666 099 A1 | 8/1995 |
| EP | 0 761 286 | 3/1997 |
| EP | 0 858 837 | 8/1998 |
| EP | 0 899 430 | 3/1999 |
| EP | 0 902 172 | 3/1999 |
| EP | 0 911 499 | 4/1999 |
| GB | 2 334 903 | 9/1999 |
| WO | WO 99/11910 | 3/1999 |

\* cited by examiner

*Primary Examiner*—Thomas Denion
*Assistant Examiner*—Diem Tran
(74) *Attorney, Agent, or Firm*—RatnerPrestia

(57) ABSTRACT

A diesel (compression ignition) engine having combustion management means and an exhaust gas aftertreatment system without an $NO_x$ trap, which system includes a platinum group metal (PGM) catalyst liable to be poisoned by fuel sulphur to cause significant degradation of catalyst performance, which engine is fuelled, at least intermittently, by a diesel fuel containing such levels of sulphur as to cause poisoning of the catalyst, wherein the combustion management means is effective to modulate the air/fuel ratio ($\lambda$) to 0.95, preferably 0.90, or richer for a time which is in aggregate sufficient to cause release of significant quantities of sulphur-containing species from the catalyst or catalyst components, whereby the catalyst is regenerated.

20 Claims, No Drawings

REGENERATING SULPHUR POISONED DIESEL CATALYSTS

This application is the U.S. national phase application of PCT International Application No. PCT/GB00/03379.

This invention concerns improving diesel catalyst performance, especially where the catalyst is a catalyst in the exhaust gas from a diesel engine fuelled by "higher sulfur" fuel.

It is well known that fuels, including gasoline or diesel (gas-oil) fuels containing relatively high sulfur content, e.g. about 350 ppm in the case of diesel fuel, lead to a number of disadvantages when trying to cleanup the exhaust gases by some form of catalytic aftertreatment. During the combustion process, sulfur in the fuel is converted to sulfur dioxide ($SO_2$) which poisons in particular platinum catalysts. The platinum catalyst itself catalyses the oxidation of $SO_2$ to $SO_3$ which adsorbs strongly onto the surfaces of platinum particles and is extremely effective as a catalyst poison. Further contributions to poisoning problems arise from the formation of base metal sulfates from the other components of a catalyst formulation, which sulfates can act as a reservoir for poisoning sulfur species within the catalyst.

A number of catalysts may be used in association with such lean combustion engines as diesel engines, including oxidation catalysts, $NO_x$ storage catalysts and the combination of platinum oxidation catalyst and a particle filter/trap which utilises the formation of $NO_2$ from NO in the exhaust gases, and the combustion of trapped sooty particles by reaction with the $NO_2$. This system is described in, for example, our EP-A-0341832 and such systems are commercially available as the "CRT"™. In all these cases, the unavailability of low (<50 ppm) sulfur fuel, even for one or two tankfuls, can seriously degrade the performance of the catalyst, and performance may never recover fully, or some other damage may be caused to the engine system or catalyst system.

There is therefore a real need for a system or a method of operation that will permit either the occasional tank filling with high sulfur fuel or even more continuous operation using high sulfur fuel, without causing undue damage to the catalyst or the complete system.

We have previously proposed, in WO99/11910, a system for the reduction of sulfur poisoning in an underfloor catalyst, by the initiation of an engine operating system, e.g. by enriching the exhaust gases with CO and/or hydrocarbon, to raise the temperature of the catalyst to at least 550° C. Such a system has particular application to a gasoline-fuelled engine operating as a stoichiometric ($\lambda=1$) engine.

We have now discovered that by performing a series of regeneration events a "little-and-often", catalytic activity of sulfur poisoned diesel catalysts can be recovered to a greater extent than when regeneration is performed following extended periods of sulfation.

According to one aspect, the invention provides a diesel (compression ignition) engine (which typically operate at approximately $\lambda=3$, with a range of between 1.5 (high load) and 5 (low load/idle)) having combustion management means and an exhaust gas aftertreatment system without a $NO_x$ trap, which system comprising a platinum group metal (PGM) catalyst liable to be poisoned by fuel sulfur to cause significant degradation of catalyst performance, which engine is fuelled, at least intermittently, by a diesel fuel containing such levels of sulfur as to cause poisoning of the catalyst, wherein the combustion management means is effective to modulate the air/fuel ratio ($\lambda$) to 0.95, preferably 0.90, or richer to provide a series of peak enrichments for a time which is in aggregate sufficient to cause release of significant quantities of sulfur-containing species from the catalyst or catalyst components, and wherein each regeneration is for 10 seconds to 10 minutes, whereby the catalyst is regenerated.

The combustion management means may initiate the necessary level of enrichment according to a pre-determined frequency, or in response to a condition indicating catalyst poisoning or the danger of catalyst poisoning, for example by some form of sensing of sulfur levels either directly or indirectly. This may be achieved, for example by on-board diagnostics indicating that the catalyst is no longer performing in the correct and appropriate manner.

The combustion management means ideally forms part of a conventional electronic engine control unit.

Conventional Diesel engines normally operate under lean conditions, with a considerable excess of oxygen over that required for combustion of the hydrocarbon fuel. However, some engines may operate at a slightly rich condition in some parts of their load/speed map. Such regions can be extended by appropriate control of fuelling, EGR rates, and if necessary throttling air intake to one or more of the cylinders.

Modern diesel engine designs are tending towards so-called "common-rail" fuel injection systems. The use of these are particularly preferred in the present invention because of the ability to control quantity and timing of fuel injection. Accordingly, one method of operating the present invention is to incorporate, during the enriched operating conditions, such a quantity of fuel post combustion in the main power stroke, as to reach in the exhaust gases, $\lambda$ of 0.95 or richer. This may be achieved by generally known means. The post combustion enrichment may be in one or more of the cylinders, providing that the overall air/fuel ratio reaches 0.95 or richer. Of course, the quantity of air may be restricted as an alternative, or in addition, providing that driveability is not noticeably affected.

It is envisaged that the simplest method of operating is to cause enrichment to a pre-determined level for the necessary time. However, it may be more advantageous to ramp up to either a peak or a plateau, or to carry out a series of peak enrichments. The ideal format may be determined for any particular engine and catalyst system by routine testing. The enrichment profile may be varied according to operating conditions.

We believe, although we do not wish to be restricted by theory, that the present invention permits the release of sulfur both as $SO_2$ and as $SO_3$ from a poisoned catalyst surface. It is preferred to avoid catalyst components which store or retain sulfur species.

The air/fuel ratio necessary for successful regeneration depends on the temperature, and the catalyst concerned. For practically convenient temperatures to be effective normally $\lambda=1$, or a slightly leaner environment is required, suitably to $\lambda=1.1$. Regeneration times are lower with more strongly reducing conditions. Typically $\lambda=0.95$ is appropriate at temperatures in the range 250–500° C. More strongly reducing conditions can result in formation of increasing amounts of undesirable hydrogen sulphide ($H_2S$). This has a disagreeable odour, and is itself a powerful catalyst poison that strongly adsorbs to metal catalyst surfaces. Accordingly, present indications are that $\lambda=0.90$ to 1.1 is a suitable range.

According to a further aspect, the invention provides a method of regenerating a PGM catalyst poisoned by sulfur in the exhaust gas aftertreatment system of a diesel engine, which system does not include a $NO_x$ trap, which method comprises modulating the air/fuel ratio (λ) of the exhaust gases passing through the catalyst, to λ=0.95, preferably 0.90, or richer to provide a series of peak enrichments for a time which, in the aggregate, is sufficient to cause release of significant quantities of sulfur-containing species from the catalyst or catalyst components, and wherein each regeneration is for 10 seconds to 10 minutes, whereby the catalyst is regenerated.

Desirably, during the enriched operating condition, catalyst temperatures are in the range 200–500° C., preferably 350–500° C., although other temperatures may be used, up to 600° C. or more.

In general, increasing the catalyst temperature decreases the time necessary to achieve maximum regeneration, and increasing time at temperature increases the degree of reactivation. Accordingly, our initial tests have been successful with regeneration times of from 10 seconds to 5 minutes. A suitable time is therefore considered to be from 2 seconds to 10 minutes, preferably in the form of shorter times or pulses, for example 250 milliseconds to 5 seconds.

In a particularly preferred embodiment, the exhaust gas aftertreatment system includes an oxidation catalyst and a downstream particulate or soot filter i.e. it includes our CRT™ system as described in EP-A-0341832. According to this aspect, the invention provides an engine according to the invention wherein the catalyst is an oxidation catalyst and the exhaust gas aftertreatment system also includes a particle or soot filter downstream of the catalyst.

Gas flow rate has an effect on the time necessary to complete regeneration, and suitable space velocities for the exhaust gases are in the range 5,000 to 50,000 hour$^{-1}$.

Although post combustion injection into the engine cylinder is, at present, the preferred method of operation according to the present invention, the invention encompasses direct injection into the exhaust gases, which may be in or close to the exhaust manifold, or into or close upstream of the catalyst housing.

The following Examples illustrate prior art methods and arrangements and provide useful background for understanding the present invention.

EXAMPLE 1

A standard production 1997 model year European passenger car with a five cylinder 2.5 liter displacement direct injection Diesel engine that was calibrated to meet European Stage 2 emission levels was used without modification to the engine or its management systems.

The car's exhaust system was equipped with a single round platinum-based oxidation catalyst located in an underfloor position. The catalyst comprised a cordierite monolith having 400 cells/inch$^2$ (62 cells cm$^{-2}$), with an external diameter of 5.66 inch (14.38 cm) and length 6 inch (15.24 cm), carrying a washcoat with a platinum loading of 90 g/ft$^3$ (3.18 g l$^{-1}$).

The vehicle was tested according to the Stage 3 European procedure, without any idle period. In each case the results given are the average of three independent measurements, and are expressed as grams of pollutant/km, which were derived in the normal way. In all of the tests the NO$_x$ figures were similar, but the NO$_2$/NO ratio depended on the catalyst activity. In this experiment only hydrocarbon and carbon monoxide tail pipe measurements were made.

The exhaust gas directly from the engine contained 0.340 and 1.074 g/km hydrocarbon and carbon monoxide respectively.

With the fresh catalyst the tailpipe hydrocarbon and carbon monoxide figures were 0.102 and 0.195 g/km respectively. However, after 17600 km road operation with diesel fuel typically containing 350 ppm sulfur the tailpipe emissions had risen to 0.287 and 0.823 g/km for hydrocarbons and carbon monoxide respectively. Changing the fuel to a grade containing 38 ppm sulfur followed by normal driving for 1500 km did not significantly improve the catalyst performance. The tail-pipe emissions were 0.247 and 0.808 g/km for hydrocarbon and carbon monoxide respectively.

The catalyst in its stainless steel enclosure was then removed from the car and fitted to the exhaust system of a four-cylinder engine capable of operating slightly rich. It was coupled to a dynamometer mounted on a bench. The fuel used contained 250 ppm sulfur. The catalyst was exposed to exhaust gas corresponding to λ=0.95 for a total period of 5 minutes at a maximum of 500° C. The average temperature was 450° C. After this treatment the catalyst was refitted to the car and retested in the standard way, with the following results: 0.119 and 0.257 g/km for hydrocarbon and carbon monoxide respectively.

These experiments show the oxidation performance of a catalyst deactivated through use with sulfur containing fuel can be reactivated by a short reductive process, even in the presence of sulfur.

EXAMPLE 2

A similar platinum-based catalyst to that in Example 1, that had been road aged (with fuel containing typically 350 ppm sulfur) for 18240 km on the same car as in Example 1, gave the following tail pipe emissions in a European Stage 3 test: 0.270 and 0.856 g/km for hydrocarbon and carbon monoxide respectively.

A core (25 mm diameter, 38 mm long) from the middle of this catalyst was taken with the aid of a diamond tipped tool. The sample was placed into a laboratory test unit. A gas flow containing 400 ppm carbon monoxide, 300 ppm nitric oxide, 100 ppm propene, 12% oxygen, 4.5% water, 4.5% carbon dioxide, and 20 ppm sulfur dioxide with nitrogen balance was established through the catalyst core at a rate corresponding to a space velocity of 60×10$^3$ hours. The conversion of nitric oxide to nitrogen dioxide over the catalyst was 19% at 300° C.

The catalyst core was then subjected to a reductive regeneration procedure at λ= 0.95, with the same space velocity as before. The λ=0.95 condition was obtained by increasing the proportion of carbon monoxide and propene, and decreasing the flow of oxygen. The temperature was gradually increased to 450° C. over 15 minutes, during which time a large amount of sulfur dioxide was liberated from the catalyst that was detected by a mass spectrometer. No hydrogen sulphide was detected by the mass spectrometer, nor was any carbonyl sulphide. It was determined that 0.56 wt % of sulfur absorbed on the catalyst had been liberated. These tests showed that the catalyst activity recovered as sulfur was removed.

The gas composition was then reset to that used initially, and the nitric oxide conversion to nitrogen dioxide measure to be 63% at 300° C., showing the ability of the regeneration procedure to reactivate catalyst for the oxidation of nitric oxide to nitrogen dioxide.

What is claimed is:

1. A diesel (compression ignition) engine having combustion management means and an exhaust gas aftertreatment system which system comprising a platinum group metal (PGM) catalyst liable to be poisoned by fuel sulfur to cause significant degradation of catalyst performance, which engine is fuelled, at least intermittently, by a fuel containing such levels of sulfur as to cause poisoning of the catalyst, wherein the combustion management means is effective to modulate the air/fuel ratio ($\lambda$) in pulses to 0.95 or richer to provide a series of peak enrichments of from 250 milliseconds to 5 seconds in duration for an aggregate time of from 10 seconds to 10 minutes, whereby the catalyst is regenerated, and wherein the exhaust gas aftertreatment system does not include a $NO_x$ trap.

2. An engine according to claim 1, wherein the combustion management means is effective to modulate the air/fuel ratio pulses to 0.90 or richer.

3. An engine according to claim 1, wherein the catalyst is an oxidation catalyst.

4. An engine according to claim 1, incorporating "common rail" fuel injection, programmed to provide in at least one cylinder, such a quantity of fuel post combustion in the main power stroke, so as to reach, in the exhaust gases, $\lambda$ of 0.90 or richer.

5. An engine according to claim 1, wherein the catalyst is an oxidation catalyst and the exhaust gas aftertreatment system also includes a particle or soot filter downstream of the catalyst.

6. An engine according to claim 1, wherein it is fuelled with diesel fuel containing at least 250 ppm sulfur.

7. A method of regenerating a PGM catalyst poisoned by sulfur in the exhaust gas aftertreatment system of an internal combustion engine, which method comprising modulating the air/fuel ratio ($\lambda$) of the exhaust gases passing through the system, which system includes the catalyst but does not include a $NO_x$ trap, to 0.95 or richer to provide a series of peak enrichments of from 250 milliseconds to 5 seconds in duration for an aggregate time of from 10 seconds to 10 minutes, whereby the catalyst is regenerated.

8. Method according to claim 7, wherein the catalyst is in the temperature range 200–500° C., preferably 350–500° C., during regeneration.

9. Method according to claim 7, wherein the exhaust gas is derived from diesel fuel containing at least 250 ppm sulfur.

10. A method according to claim 7, wherein $\lambda$ in the exhaust gases is 0.90 or richer.

11. Method according to claim 7, wherein the catalyst is in the temperature range 350° C.–500° C. during regeneration.

12. A method of regenerating a PGM catalyst poisoned by sulfur in the exhaust gas aftertreatment system of an internal combustion engine, the method comprising modulating the air/fuel ratio ($\lambda$) of the exhaust gases passing through the system, which includes the catalyst but not a $NO_x$ trap, to 0.95 to 1.1 to provide a series of peak enrichments of from 250 milliseconds to 5 seconds in duration for an aggregate time of from 10 seconds to 10 minutes, whereby the catalyst is regenerated.

13. Method according to claim 12, wherein the catalyst is in the temperature range 200–500° C. during regeneration.

14. Method according to claim 12, wherein the exhaust gas is derived from diesel fuel containing at least 250 ppm sulfur.

15. Method according to claim 12, wherein the catalyst is in the temperature range 350° C.–500° C. during regeneration.

16. A diesel (compression ignition) engine having combustion management means and an exhaust gas aftertreatment system which system comprising a platinum group metal (PGM) catalyst liable to be poisoned by fuel sulfur to cause significant degradation of catalyst performance, which engine is fuelled, at least intermittently, by a fuel containing such levels of sulfur as to cause poisoning of the catalyst, wherein the combustion management means is effective to modulate the air/fuel ratio ($\lambda$) in pulses to 0.95 to 1.1 to provide a series of peaks of from 250 milliseconds to 5 seconds in duration for an aggregate time of from 10 seconds to 10 minutes, whereby the catalyst is regenerated, and wherein the exhaust gas aftertreatment system does not include a $NO_x$ trap.

17. An engine according to claim 16, wherein the catalyst is an oxidation catalyst.

18. An engine according to claim 16, incorporating "common rail" fuel injection, programmed to provide in at least one cylinder, such a quantity of fuel post combustion in the main power stroke, so as to reach, in the exhaust gases, the air/fuel ratio ($\lambda$) pulses.

19. An engine according to claim 16, wherein the catalyst is an oxidation catalyst and the exhaust gas aftertreatment system also includes a particle or soot filter downstream of the catalyst.

20. An engine according to claim 16, wherein it is fuelled with diesel fuel containing at least 250 ppm sulfur.

* * * * *